United States Patent [19]
Manser et al.

[11] Patent Number: 5,186,539
[45] Date of Patent: Feb. 16, 1993

[54] MIXING KNEADER DEVICE AND METHOD FOR THIS PRODUCTION OF DOUGH, PARTICULARLY FOR PASTA

[75] Inventors: Josef Manser, Uzwil; Friedrich Egger, Niederuzwil; Werner Seiler, Zueberwanger, all of Switzerland

[73] Assignee: Buehler AG, Uzwil, Switzerland

[21] Appl. No.: 508,086

[22] Filed: Apr. 11, 1990

Related U.S. Application Data

[63] Continuation-in-part of Ser. No. 426,787, Oct. 25, 1989, abandoned.

[30] Foreign Application Priority Data

May 25, 1989 [CH] Switzerland ............... 01968/89
Nov. 19, 1988 [CH] Switzerland ......... Pct/CH88/00219

[51] Int. Cl.$^5$ .............................................. B01F 7/08
[52] U.S. Cl. ......................................... 366/85; 366/97
[58] Field of Search ................. 366/79, 80, 81, 82, 366/83, 84, 85, 96, 97, 144, 149

[56] References Cited

U.S. PATENT DOCUMENTS

| | | | |
|---|---|---|---|
| 4,423,960 | 1/1984 | Anders | 366/85 |
| 4,474,473 | 10/1984 | Higuchi | 366/85 |
| 4,534,652 | 8/1985 | Stade | 366/85 |
| 4,752,135 | 6/1988 | Loomans | 366/85 |

Primary Examiner—Robert W. Jenkins
Attorney, Agent, or Firm—McAulay Fisher Nissen Goldberg & Kiel

[57] ABSTRACT

The new invention proposes a new method and a device for the production of dough, particularly for pasta. The formation of dough from the dry raw materials to the finished pressed products is effected in a very short time in two stages. A raw dough is first produced in a 2-shaft mixing kneader; this dough has a substantially complete protein structure. The forming of the dough, including the mixing of the raw materials, takes place by means of an interplay of kneading and shearing, but without extrusion die pressure at the end of the first stage. In the case of classic pasta, the dough which is produced in pieces by the short 2-shaft mixing kneader is transferred to a long single-shaft press and pressed with high pressure to form the desired shapes.

15 Claims, 9 Drawing Sheets

MIXING KNEADER DEVICE AND METHOD FOR THIS PRODUCTION OF DOUGH, PARTICULARLY FOR PASTA

CROSS REFERENCE TO RELATED APPLICATIONS

This is a continuation-in-part application of Ser. No. 426,787 filed Oct. 25, 1989, now abandoned.

BACKGROUND OF THE PRESENT INVENTION

1. Field of the Present Invention

The invention is directed to a mixing kneader device for the production of raw dough, comprising a closed housing, a product feed opening, a discharge outlet and continuously working work elements in the housing.

2. Background Prior Art

A multitude of processing machines are currently being used for dough making. Pasta makes up an increasing proportion of the foodstuffs prepared via the dough die. The shaping is effected for the most part by means of an extrusion process in which the viscous dough is pressed through the press dies at high pressures of, e.g., 80 to 120 bar and cut to a desired length.

Different binding forces are utilized for the shaping and for the subsequent retention of shape. The so-called protein structure is the classic binding. The protein structure is the net-like, spatial interlinking of all protein cells which hold together the starch which is in crystalline form. The protein structure can be changed and re-structured as often as desired, but only as long as there is sufficient water and the protein does not coagulate due to higher temperatures. Vegetable albumin behaves in a way very similar to the hen's egg. When a hen's egg is broken in cold water, it virtually retains its shape if this is done carefully. When stirred briskly or beaten, a watery egg soup is obtained which is colored by the egg. Its behavior is completely different when the same egg is broken in boiling water. With a few seconds, the egg takes on an almost bizarre outline shape and retains this without mechanical intervention. In order to obtain a fine distribution of the egg material, the entire contents of the egg must be beaten and stirred vigorously immediately after being thrown into the boiling water. The finely distributed egg particles thus retain their refined shape. In the presence of heat, the coagulation of the egg mass takes place in the egg immediately, within seconds, and is irreversible. All albumin-containing raw materials processed with heat in the foodstuffs industry must take these facts into account. This is true particularly in the case of extruded products.

The temperature boundary value before the irreversible point is between 60° and 80° C.; that is, already below the actual boiling temperature (that is, below 100° C.). If a product mass is brought into the range of 100° C. or more during the mixing, kneading and dough forming, only an insufficient protein structure is developed in a subsequent shaping process, e.g. for classic pasta such as macaroni.

Over the past three to four decades, two independent foodstuffs processing methods have come into use:

Process A

All products which are deliberately subjected to a boil-like or roast-like change during the processing, particularly during the phase of dough formation. Binder forces other than those of the protein structure are utilized predominantly for the shaping of the dough parts. The temperatures range from approximately 90° to 100° C. up to 200° C. and 300° C., respectively.

Process B

All products which do not exceed a temperature of between 60° and 70° C. during processing, that is, while avoiding irreversible changes with respect to the protein binding. These are primarily classic pastas which only undergo an actual thermal change (cooking through, etc.) prior to consumption by means of the boiling process.

In practice, the so-called double-shaft extruder is widely used for Process A. In technical circles, this is often designated as a screw conveyor pair with the worst efficiency. The poor efficiency includes, above all, the conversion of the corresponding drive output into friction heat. The friction heat generated in the dough is one of the process parameters for the heating and for the thermal treatment of the products. The product is heated to 100° to 200° C. by means of the friction heat and possibly subjected to a boiling effect with additional heating elements.

In Process B, especially for pasta dough and all corresponding special doughs, any increase in the dough temperature above the range of 60° to 70° C., even only in places, must be avoided. As far as is known by the present inventors, mixing troughs for mixing all raw materials have been used almost without exception in process B in recent times for dough formation for pastas, and subsequently one or more single-shaft screws for building up the protein structure and for dough formation and for building up the pressure of 80 to 120 bar required for the final shaping. Thus, the temperature can not only be kept under control, but remains substantially below the critical value of 60° to 70° C., so that there is no irreversible damage to the product. The simplest evidence for this is offered by the fact that cutting wastes after the pressing of the products may be added again to the raw material to be pressed without a loss in quality.

A substantial difference between Process A and Process B consists in that the product throughput for pasta doughs and in pasta presses in larger systems, respectively, is at present conventionally in the order of magnitude of 500 kg to 2500 kg an hour. In comparable motor-driven drive outputs for process A, the product throughput is several hundred kg per hour.

A second difference consists, in addition, in the speed of the pressing screw. In pasta presses, the speed is between 20 and 100 revolutions per minute, in the two-shaft extruders for Process A, speeds of 200 to 300 rpm and substantially more are generally used.

In the extrusion method according to Process A, a large portion of the invested motor output is converted into heat and only a small portion for the extrusion die pressure, and the smallest portion for the actual forming of the dough. This explains the great discrepancy between the ratio of motor output to throughput in pastas on the one hand and in products using a boiling extrusion process with a familiar very low throughput on the other hand.

Problem Addressed and Solution of the Present Invention

The invention addresses the task of providing and improving a device for forming dough for unboiled products, that is, particularly for pasta products, which satisfies the highest requirements with respect to hygiene and which is simple with respect to construction in terms of the apparatus.

The solution, according to the invention, is characterized in that the work elements comprise two cooperating work shafts on which mixing and kneading elements are arranged which have positive conveying action in the entire work cross section of the housing.

To the surprise of all participating specialists, the proposed task was solved in a faultless manner. The conveying and kneading action of a screw pair is known. The kneading action can be intensified by applying two cooperating screws instead of a single screw. Since a screw has a conveying effect that is even gentle with the product when suitably designed, it has been assumed implicitly up to the present that an intensification of the kneading action is brought about as the static pressure on the dough increases. Since an extrusion is delivered at the outlet in the conventional cases of application, a desired twofold action was seen in this fact, the kneading pressure on the one hand and the extrusion pressure on the other hand. In many products, the simultaneously produced heat reinforced an equally desired thermal effect, such as gelatinization, cooking through, etc. It is known partly that a double-shaft pair also has a very good mixing effect. However, the new invention has departed from this only partially correct understanding to the extent that the kneading effect is not dependent as part of a total building up of pressure, but rather depends on a repeated intensive kneading.

In an especially preferred manner, the work elements are two cooperating work shafts which comprise kneading screws alternating, in each instance, in the direction of the product flow, as well as shearing elements, wherein the discharge outlet is constructed without extrusion die so as to be ready for the extrusion die. The kneading screws preferably have a positive conveying action and the shearing elements have a self-locking action. Accordingly, there is an actual self-cleaning effect. The product is also put through in the case of idling. In addition, the shearing elements preferably have a shaping action which is effective along the entire cross section. Accordingly, it is possible to achieve an ideal kneading action with very low power consumption without building up high pressure. A rolling effect is utilized between the screw pair on the one hand and a cutting effect and crumbling of the dough, respectively, on the other hand. When there is a good mixing of the components running simultaneously as well as a homogenization, only that which is necessary for the dough forming, particularly for building up a good protein structure, is made and worked for the dough. In many tests, only a very slight heating of the product was determined, so that the new invention actually brings about a real technological advance without any detectable disadvantage so far. Tests on industrial scale have further shown that the energy requirement for forming the dough is approximately equal to that required until now solely for the drive of the mixer shafts of the mixing trough. Microscopic pictures confirmed that a good protein structure was produced and also that no local heat damage occurred. The product is not permitted any possibility of deviation for the dough forming, so that every semolina kernel or flour particle is really bound in the dough. No white spots could be detected on the finished products without special means. Judging from the results, it is even presumed that the new invention made possible a high quality not previously achieved with respect to the dough formation A small clue may consist precisely in the fact that no high pressure is built up for the forming of the dough. The cutting elements actually cut the dough mass into pieces. This could possibly be prevented under high pressure. The forming of dough with the new invention is radically shortened in terms of time as well as with respect to construction, which in relatively dry dough of 25 to 40% or 28 to 32% moisture, respectively, could not previously be achieved in spite of research work lasting decades, but is first achieved by means of the new invention.

The invention allows various other advantageous constructions. Thus, the first set of kneading screws is advantageously constructed as a feed screw pair and the last set of kneading screws is constructed as a discharge screw pair.

It is particularly preferable that three or more sets of screw pairs are arranged one after the other, each comprising a set of shearing element pairs arranged between them.

In another advantageous design idea, the work shafts are constructed as shafts rotating in the same direction, where the two shafts preferably comprise a drive for less than 200 revolutions per minute, preferably for 20 to 100 revolutions per minute or, most preferably, for 40 to 70 revolutions per minute In unproblematic cases of application, the work shafts can be arranged so as to run in opposite directions. The advantage of this embodiment idea consists in constructionally simplified requirements on the device and the drive of the device, respectively, in terms of construction. Further, it is also possible to apply more than two, e.g. three or more cooperating work shafts with different kneading and conveying or locking actions. It is recommended, in addition, to arrange cooling and heat exchanging means in the stationary housing. In this way, the entire device can be heated to optimum temperature for the processing at the commencement of production, since a heating is effected at temperatures which are too low, since the forming of the dough is impeded and proceeds more slowly at temperatures which are too low, e.g. below 20° C.

The connections for the raw material feed, particularly for semolina and water, are directly into the first portion of the device which is provided with screw elements and is constructed as a low-pressure mixing kneader, wherein the latter is used in combination with a long single-shaft pressing screw for the production of pasta. The single-shaft pressing screw now assumes the part of homogenization in reciprocal action with the high pressure build-up. It has been shown that an optimum distribution of work which could not be achieved previously is now achieved between the individual devices, of which there are still only two; since the forming of dough is complete with respect to the protein structure in the mixing-kneading device, a dough is formed which is moist but which is not sticky to the touch, so that the transfer can be effected simply by means of gravity without the risk of sticking or stopping. The outlet opening of the mixing kneader is therefore preferably constructed so as to be open, that is, without extrusion nozzles. The opening is preferably selected so as to be smaller than the double-cylinder cross section, but larger than the working cross section remaining open between the work shafts and the double cylinders. The rearmost set of cutting knives crumbles the dough and the rearmost set of screw elements, as seen in the direction of product flow, obtains predominantly an ejecting function for the dough pieces without a pressure build-up in the area of the discharge outlet.

The active length of the single-shaft pressing screw is preferably constructed so as to be at least twice as long as the active length of corresponding screw elements of the low-pressure double-shaft mixing kneader, wherein it is especially preferable that the single-shaft pressing, in its entirety, be constructed so as to be at least 2.5 times longer than the low-pressure double-shaft mixing kneader.

For the highest pasta quality, an air vacuum connection is advantageously provided between the low-pressure double-shaft mixing kneader and the single-shaft pressing screw.

Further, it is possible to arrange a pump in the area of the extrusion die of the single-shaft pressing screw for the production of products such as cannelloni or ravioli.

The invention further concerns a method for the production of raw dough for pasta dough with a liquid component of 25 to 40 percent by weight, which is brought into the desired shape and cut in a subsequent pressing with a screw press or the further processing by means of rolls, respectively.

Every participating specialist in the field of industrial pasta production will be able to confirm that dough production has not undergone any change for at least two to three decades, although annoying problems were known with respect to cleaning and hygiene. It was not possible until now to meet the demand for high quality of the finished product except with the known method applied in practice. One of the prominent structural component parts was the trough mixer, which was viewed as irreplaceable in relation to the dough trough of commercial and industrial bread production. Recently, it has been realized that the trough, which does not fit the picture of continuous product flow, and the batchwise distribution of the product flow, respectively, is still in full use in the bread industry, since optimal conditions could not otherwise be provided for the biochemical processes in the dough formation.

Inexpensive pasta loses a portion of the starch during boiling; this starch is thrown away as boiling losses with the milky-white cooking water. Small white specks are often detected in inferior pasta. They result for the most part from individual flour or semolina particles which remained dry during the dough processing and could therefore not be bound into the protein structure.

The new method was assigned the task of simplifying the dough production, particularly so that it can be better kept under control, wherein the quality of the finished product must satisfy the highest requirements, particularly so that an easy management of all hygienic considerations can also be ensured.

The method, according to the invention, is characterized in that the raw materials are mixed by means of a cooperating work shaft pair with simultaneous positive conveying and are kneaded by means of repeated kneading action to form a raw dough with a developed protein structure.

In another particularly advantageous design idea, the raw materials are kneaded into an unpressed raw dough in a first stage by means of a cooperating work shaft pair by means of continuous interplay of kneading and shearing and, in a second step, the raw dough is homogenized in a single-shaft press or brought into the desired shape via dough rolls under high pressure or via rolls.

The new method, according to the invention, has allowed for the first time to separate the dough kneading from the problem of shaping in the forming of the dough (especially with respect to the products with low water contents of under 40% or under 34%). As has been shown, the optimal forming of dough can be effected in a much more efficient manner, since it was realized that a genuine mechanical cutting process is only possible when the parts to be cut can be spatially separated and are displaced. One part must be able to recede from the other, which is not possible in a compact dough mass which is under high pressure. Rather, in the compact dough mass, the picture of the tough fluid mass is more accurate. One does not speak of cutting with respect to liquids. However, the all-around binding through the protein structure requires a frequent mechanical displacement of individual dough parts, as well as a simultaneous distribution of water which is as complete as possible.

The raw dough is preferably transferred from the first stage to the second step without pressure. It is especially preferable that the raw dough be thrown out in pieces from the first stage and transferred by the force of gravity directly to the second stage for the formation of a closed homogeneous dough mass.

In the area of the transfer, a vacuum is advantageously produced by means of connecting the corresponding transfer space to a vacuum pump, so as to avoid entrapped air in the shaped dough. The product can be processed in this way continuously in the stage in less than 60 seconds with a product temperature of 40° to 70° C., preferably from 40° to 50° C., and transferred into the finished form.

The invention is further directed to the use of the method for the production of long or short pasta, as well as the use of the mixing kneader for a pasta line for the production of long or short pasta immediately prior to the pressing screw or with intermediate transfer elements.

BRIEF DESCRIPTION OF THE DRAWINGS

The invention is described in more detail below with the aid of different embodiment examples. In the drawings.

DESCRIPTION OF THE PREFERRED EMBODIMENTS

Figure 1:
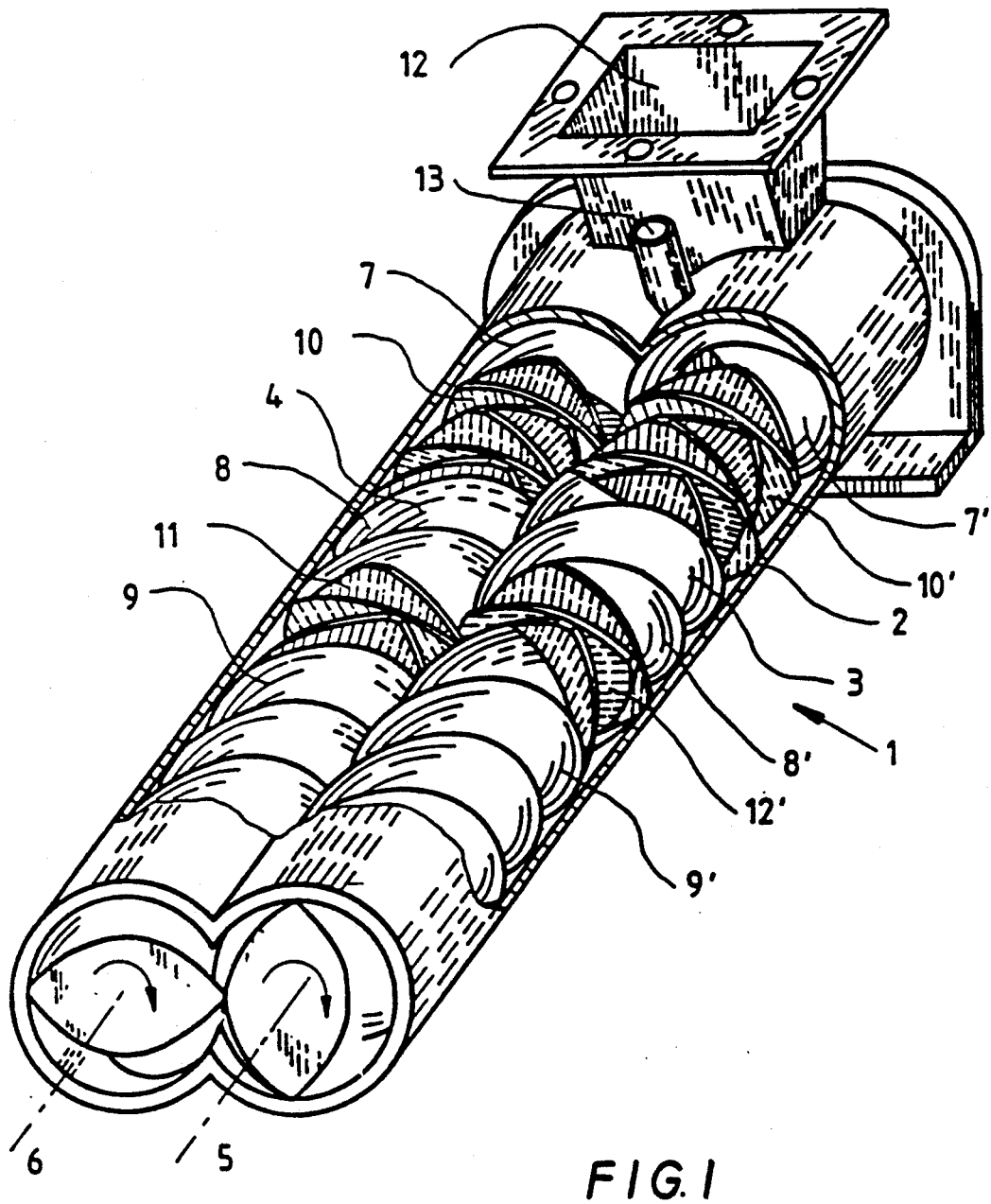
FIG. 1 shows a mixing kneader, partially in section.

Reference is made in the following to FIG. 1, which shows a new mixing kneader 1, wherein the upper part of a self-enclosed housing 2 is substantially omitted in order to illustrate the work elements 3 and 4, respectively. The two work elements 3 and 4, respectively, comprise two shafts 5 and 6, respectively, which rotate in the same direction and rotate in the clockwise direction. The two shafts 5 and 6, respectively, are alternately provided with a set of kneading screws 7, 8 and 9 and 7', 8' and 9', respectively, as well as with a set of shearing elements 10 and 11 and 10' and 11', respectively, in a corresponding manner, which is wedged on the shafts 5 and 6, respectively, so as to be fixed with respect to rotation relative to it, the latter being constructed as splined shafts. The product is fed into the mixing kneader via a product feed opening 12. The liquid component, e.g. water or egg soup, is likewise admitted directly in the vicinity of the product feed opening 12 and connection 13 are arranged in the area of the first screw 7 and 7', respectively, which is constructed as feed screw pair 14, as can also be seen in a simplified manner from FIG. 4.

Figure 2:
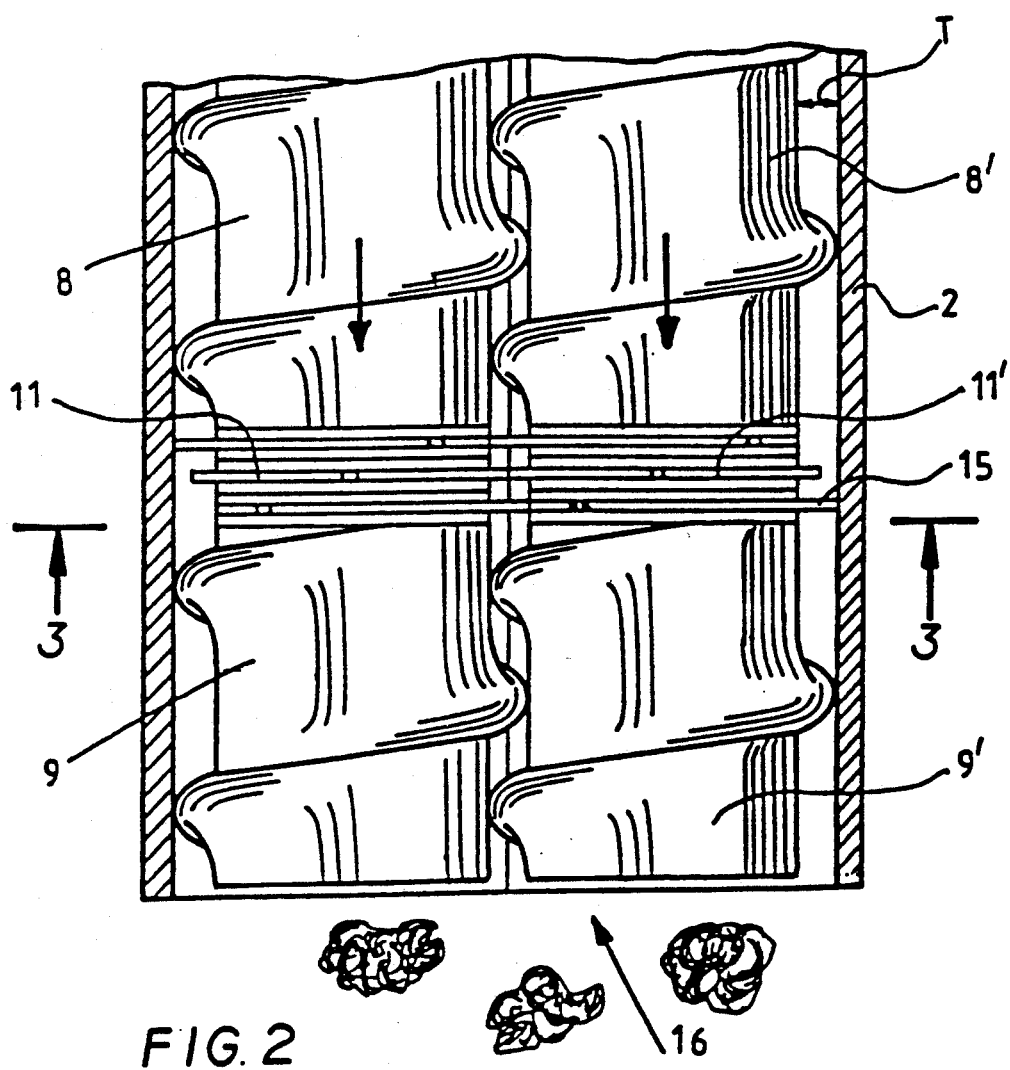
FIG. 2 shows the interplay of the work elements of FIG. 1 in outline.

Two screw pairs 8, 8' and 9, 9' and a kneading screw pair 11, 11' arranged between the latter are shown in enlarged scale and in outline in FIG. 2. The product is positively driven through the housing 2 by means of the screws 8, 8', 9, 9'. In so doing, the product in FIG. 2 passes the shearing element pair 11, 11'. Every set of shearing elements 11, 11' comprises three polygon disks 15, according to the shown example, which cut through the entire housing cross section in the manner of a toothed wheel with three teeth but so as to rotate in the same direction, which housing cross section forms a horizontal 8. Because of the threefold repetition of the polygon disks 15 and their unequivocally transverse movement they provide a consistent cutting and crumbling effect for the product which is moved through the screws primarily in the direction of the shaft axis 5, 6. It has also proven very advantageous that the cross section remaining open for the product only comprise thin-walled "cylinder portions", i.e. the screw turns have only a small depth "T".

Figure 3:
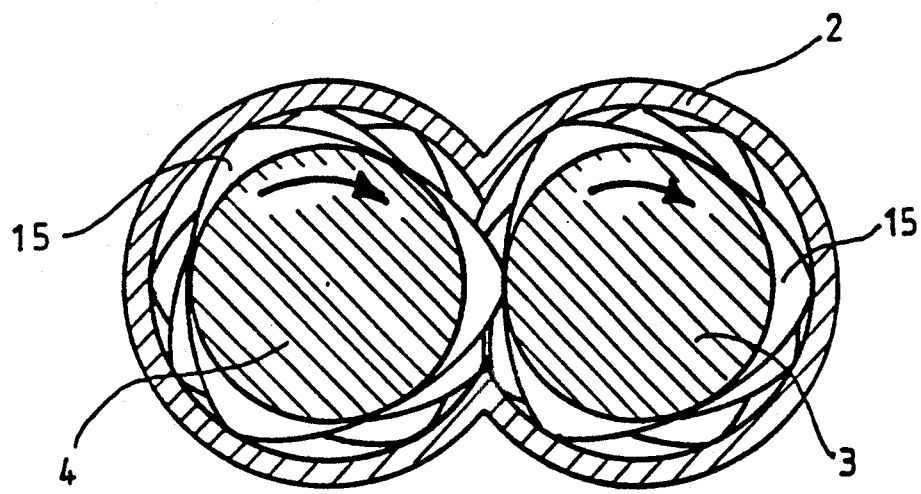
FIG. 3 shows a section II—II of FIG. 2.

The outlet end of the mixing kneader 1 is shown in FIG. 3. The product which is crumbled by means of the shearing elements 11, 11' is ejected in crumbled form or in pieces through a free discharge outlet 16. A drive gearing 17, not shown, for the two shafts 5 and 6, respectively, is arranged on the side of the product feed opening, so that, in the shown example, the two shafts 5 and 6, respectively, are supported so as to overhang from the drive side. This step permits a simplified assembly and disassembly of the work elements, particularly an easy cleaning of the entire work space, in that e.g. the work elements can be removed in the direction of the discharge outlet 16.

Figure 5:
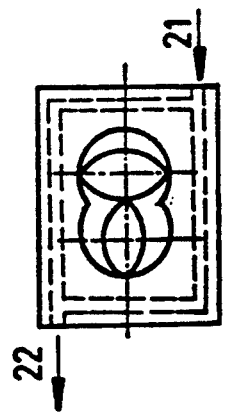
FIG. 5 shows a side view of FIG. 4.
Figure 4:
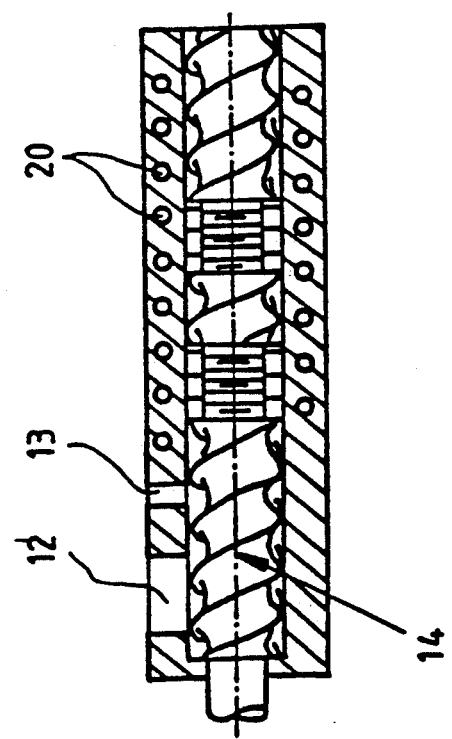
FIG. 4 shows a variant of FIG. 1 in a schematic manner.

FIGS. 4 and 5 show the same mixing kneader as in FIGS. 1, 2 and 3, but with a heat exchange system 20, wherein e.g. water which is influenced with respect to temperature is admitted through an inlet sleeve 21 and can be drained again through an outlet sleeve 22.

Figure 6:
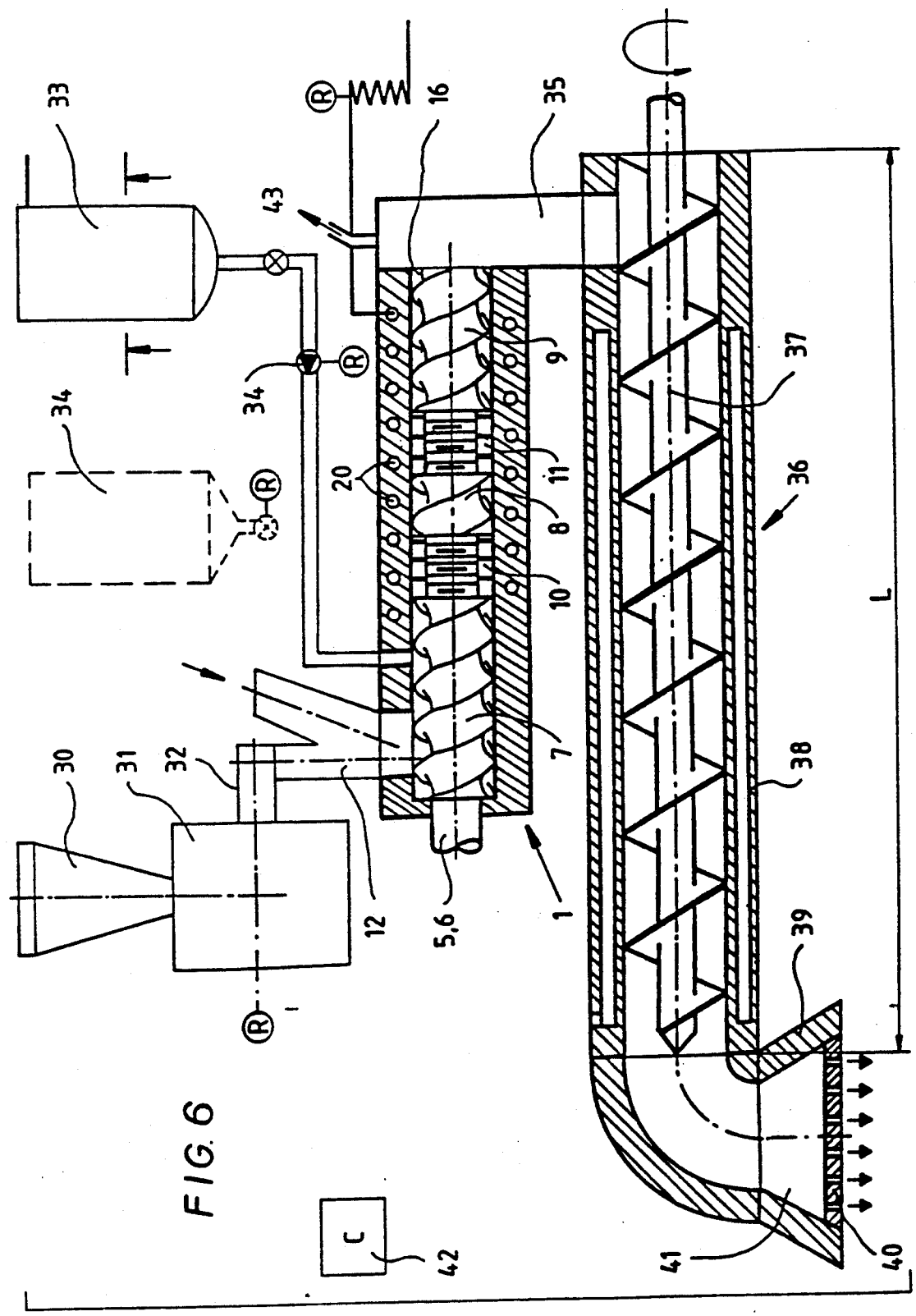
FIG. 6 shows a preferred application of the mixing kneader for the production of pasta.
Figure 7:
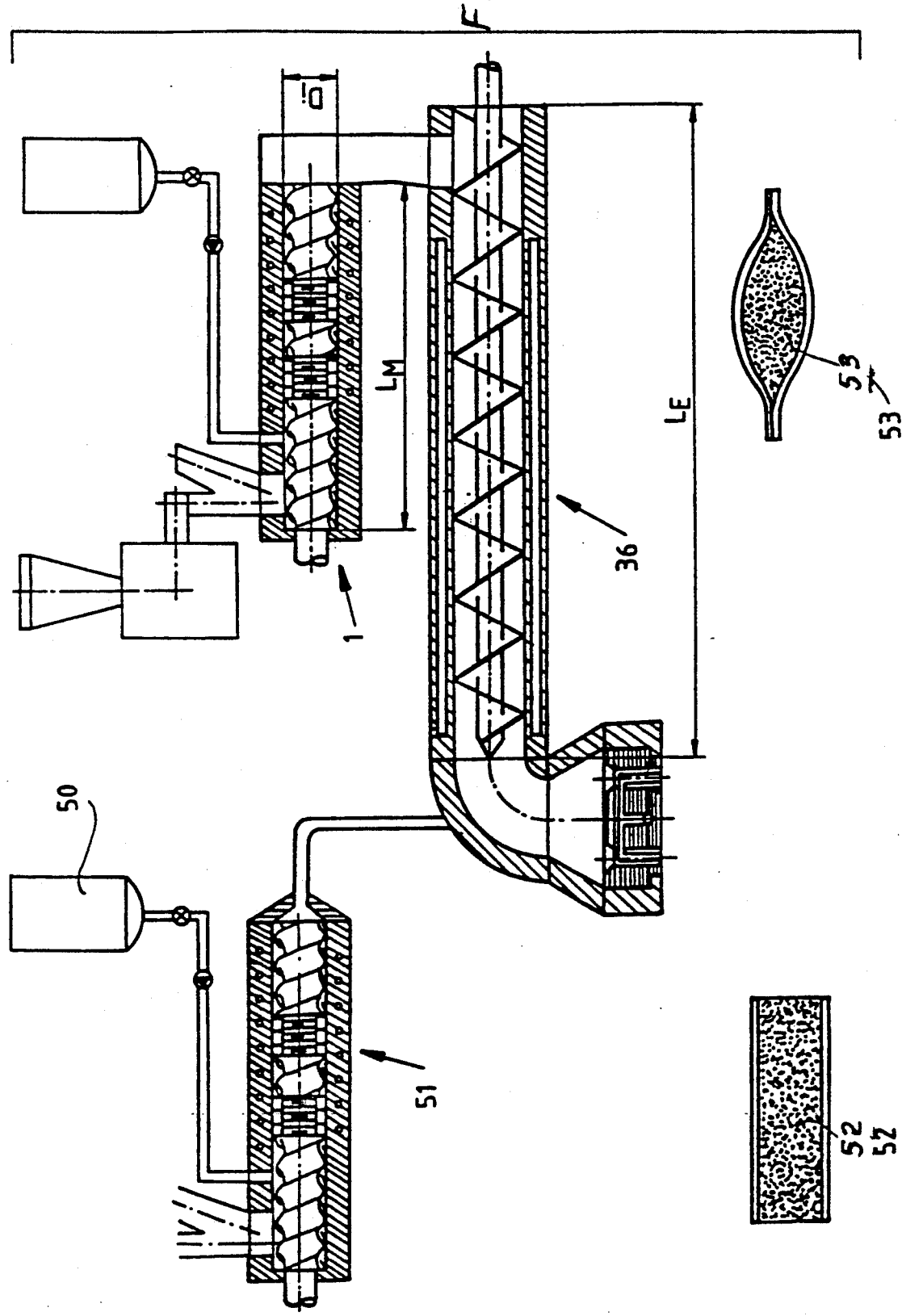
FIG. 7 shows a conception similar to FIG. 6, but for the production of products like cannelloni or ravioli.

FIG. 6 shows a schematic arrangement for a particularly advantageous realization of the new invention for the production of pasta such as spaghetti, noodles, macaroni, etc. The dry component, semolina or flour, is fed to the product feed opening 12 via a hopper 30 with metering device 31 and a feed screw 32 and in the initial portion or directly to the feed screw pair 14, respectively. A quantity of water calculated exactly for the metering output for the dry component is removed from a container 33 constructed as a balance and added to the dry component or to the feed screw pair via a pump 34. Depending on the type of desired finished product, additional egg soup, for example, can be added to the mixture via a second container 34. However, it is also conceivable to store water of different temperature in the containers and to regulate the partial quantities to a predetermined water temperature. This is one of the steps for keeping the temperature of the processing under control in extreme situations, e.g. during interruptions, changes in throughput or the starting process. A fourfold interplay of mixing or kneading and cutting is shown in FIG. 6 analogous to FIG. 1. The product which is kneaded into raw dough pieces is delivered from the free discharge outlet 16 directly into the starting area of a single-shaft pressing screw 36 via a fall chute 35 by means of gravity. The single-shaft press comprises a pressing screw 32 in a cooled casing 38. A die head 39 with an inserted pressing extrusion die 40 is at the end of the pressing duct. The single-shaft pressing screw is a special design of the extrusion, wherein a pressure of e.g. 80 to 120 bar must be built up immediately prior to the extrusion die in a distributor head 41 so that the dough mass, which is still very viscous, can be pressed through the die openings. In contrast to the functioning of the extrusion of the single-shaft screw press, the mixing kneader is not an extruder. All elements of the production unit, as shown in FIG. 6, are controlled and coordinated by means of a common SP control 42. The length ratio Lm of the mixing kneader to $L_E$ of the single-shaft pressing screw is of interest, wherein the active length of the work elements are compared (FIG. 7). It has been shown that the dough homogenization with pressure build-up can be achieved in the most optimum manner with a relatively long single-shaft pressing screw with a large working length ($L_E$). On the other hand, all tests with very long work elements of the mixing kneader have surprisingly not shown any positive effects besides a high power consumption and development of heat in the product. The best results are obtained when the length ratio ($L_E$) to ($L_M$) is at least 2:1. Length ratios of the single-shaft pressing screw to the mixing kneader of at least 2.5:1 result from the construction design in its entirety.

It is also interesting that the best values were achieved as a whole when the active length $L_M$ to the inner diameter Di is in the range of 3 to 7 in the mixing kneader.

FIG. 7 shows the additional possibility of producing filled goods such as cannelloni 52, ravioli 53, etc. The filling substances of meat, vegetable or sweet components are removed from a container 50 and pressed into the product directly via the corresponding duct system of the pressing head and via a special pump 51.

Figure 8:
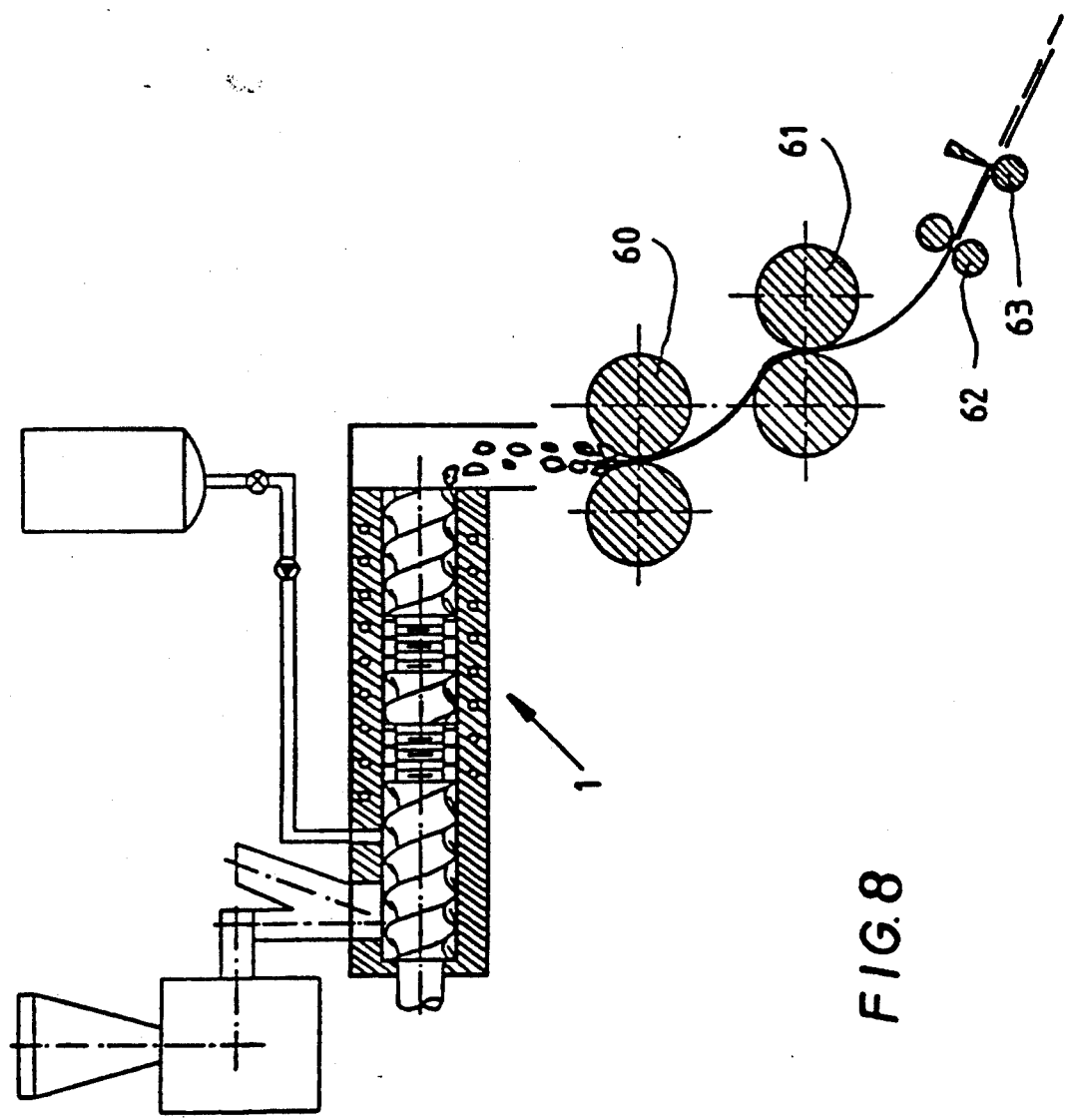
FIG. 8 shows the interplay of the new mixing kneader with subsequent pasta rolls.

FIG. 8 shows an additional interesting realization of the invention for rolled pasta. The dough pieces falling from the mixing kneader are transferred directly to a pre-calibrating roll 60 and the formed strip is transferred directly to a calibrating roll 61. The strip of dough is converted to a desired dough leaf form, first through a longitudinal cutter 62 and subsequently through a transverse cutter 63, which dough leaf form is brought to a storable water content in a subsequent dryer.

The invention can be used in a plurality of other special products, e.g. for the production of flake pastry or for the breading flour production for the production of the raw dough.

Figure 9:
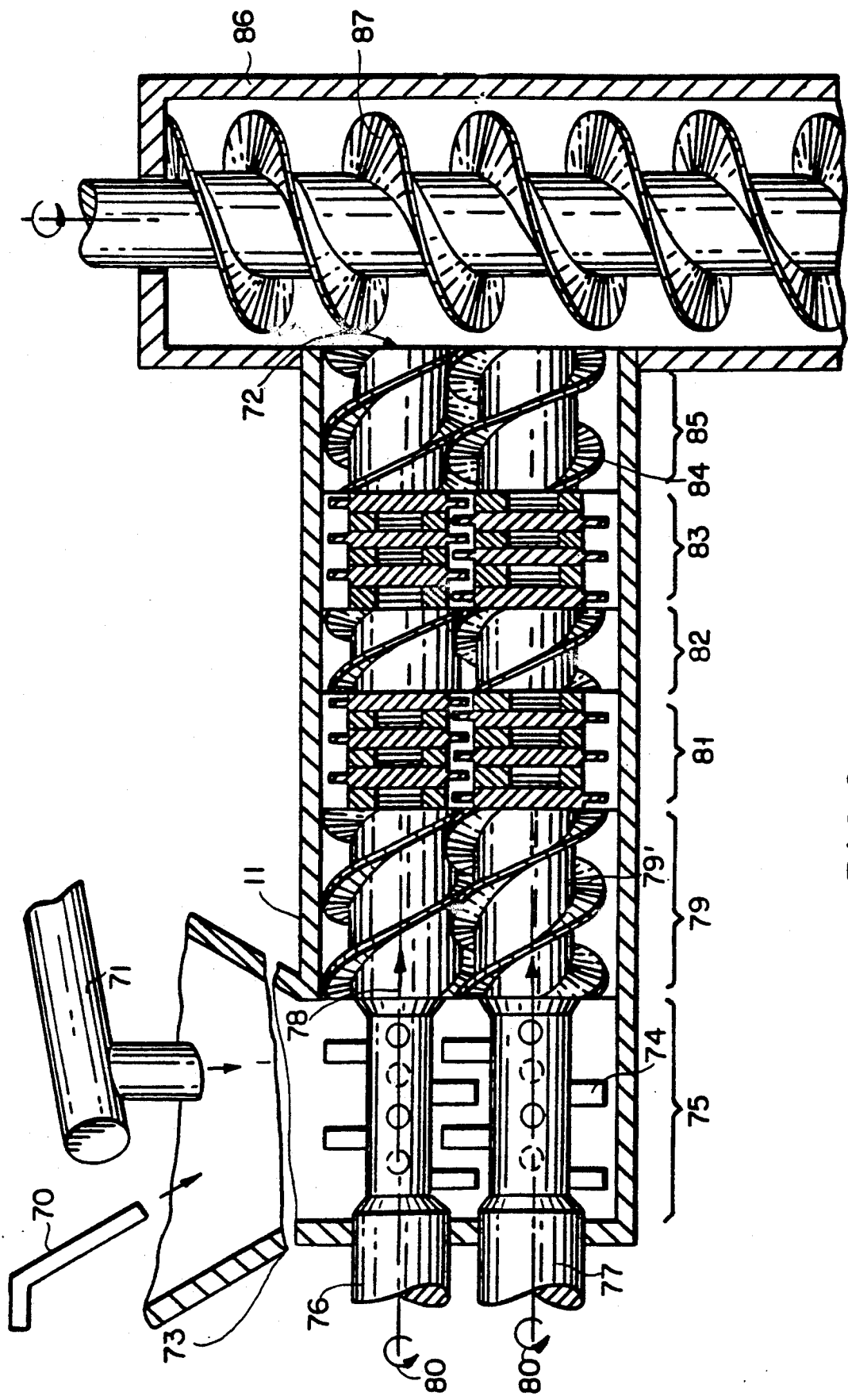
FIG. 9 shows another embodiment form of the mixing kneader with direct transfer of the raw dough to a single-shaft pressing screw.

FIG. 9 will be referred to in the following. Water is metered directly into the mixing kneader 11 via a line 70. The dry raw material components are fed uniformly via a feed head 71. The dry raw material is moistened already in the inlet area and intimately mixed and guided into the repeated kneading 5 zone. The mixing kneader 11 kneads a crumbly dough out of the raw product. When the outlet end 73 of the mixing kneader 11 is free, dough pieces of e.g. 1 to 5 cm are formed, partly almost hand-size pieces which give the impression of being friable and crumbly, similar to the interior of a baked bread. If the outlet end is narrowed, a "sausage" of similar character is shaped, but as a continuous shape. However, in both cases, the crumbly dough does not yet have the character of a compact homogenous dough. That is, if a piece of the crumbly dough is torn off, the actual character of the dough can easily be determined by the plastic-elastic and non-sticky property. A microscopic examination shows that the crumbly dough at the outlet end of the mixing kneader 11 actually already has the full development of the protein structure. However, since this is a dry dough and the actual shaping press pressure of e.g. 80 to 100 or more has not yet been applied, this impression of an easily crumbling dough is only apparent.

Figure 10:
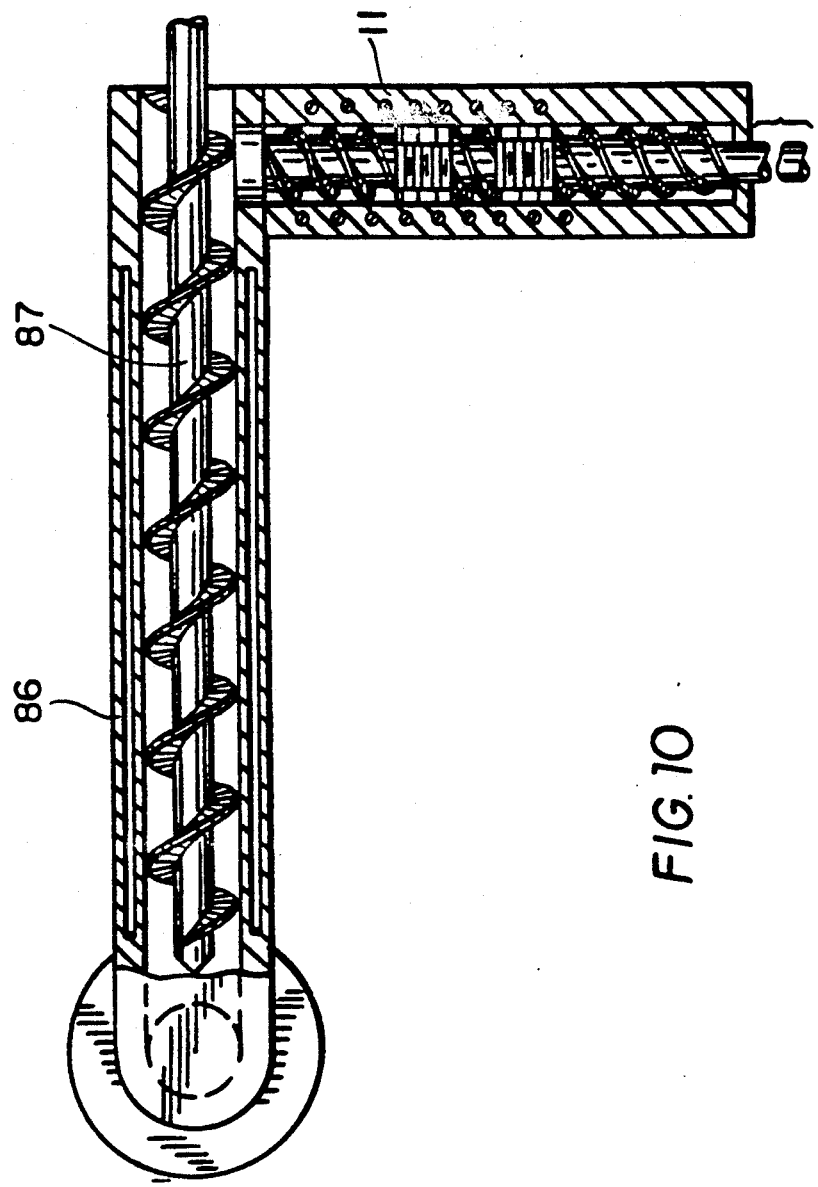
FIG. 10 shows the angular assembly of a mixing kneader with single-shaft pressing screw in a schematic manner.

The formation of crumbly dough proceeds as follows: the raw materials water and semolina or flour are fed into the inlet of the mixing kneader 11. FIGS. 9 and 10 show the actual kneading body in a horizontal position, that is in a view from the top. On the other hand, the inlet is shown from the side, that is, in upright position. In other words, the kneading body is shown tilted by 90° into the upright drawing plane, which is indicated by the drawing section lines 73. The raw material is grasped by two work shafts 76 and 77, respectively, via the feed elements 74 and the inlet zone 75, respectively, and is conveyed to the right, according to arrow 78, into a first kneading zone 79.

A pair of revolving kneading screws 79' are arranged in each instance in the kneading zone 79 on each work shaft 76 and 77, respectively. The two work shafts 76 and 77, respectively, rotate in the same direction (arrow 80) and mesh with one another similar to two screw toothed wheels. Accordingly, a twofold effect occurs: a conveying of the product (arrow 78) and a compression; a compressed mass is formed. This mass is now pre-kneaded and kneaded in the first actual kneading zone by means of the kneading screws 79'.

The kneading screws 79' can be constructed in such a way that they result in an action which dams slightly but also conveys. The mass leaving the kneading zone 79 is pressed through a shearing zone 81 into a second kneading zone 82, likewise with positive conveying. The development of the protein structure is concluded in the next shearing zone 83. Similar or different kneading elements can be used alternately in part in the kneading zone 83. On the whole, the action of the mechanical pressure and conveying forces occurs in a very directed manner at relatively very small dough portions, so that virtually no unnecessary pressure forces and friction effects occur.

This is why only a slight increase in the temperature takes place compared with earlier kneading devices. The dough mass is fed to a discharge screw 84 or guided through a corresponding discharge zone 85, respectively, at the end of the kneading zone 83 and is fed via the outlet end 72 for further processing. The shown 2-shaft mixing kneader has the particular advantage that it works in a self-cleaning manner to a great degree. Depending on the construction of the outlet end, the dough can be discharged as dough pieces or, with slight narrowing and corresponding pressure build-up, in strands.

Of course, various constructions can be used for the work elements acting in the individual work zones, particularly with respect to the kneading and working elements, e.g. perforated disks, resistance bodies directed from the outside to the inside, pins, etc.

Figure 11:
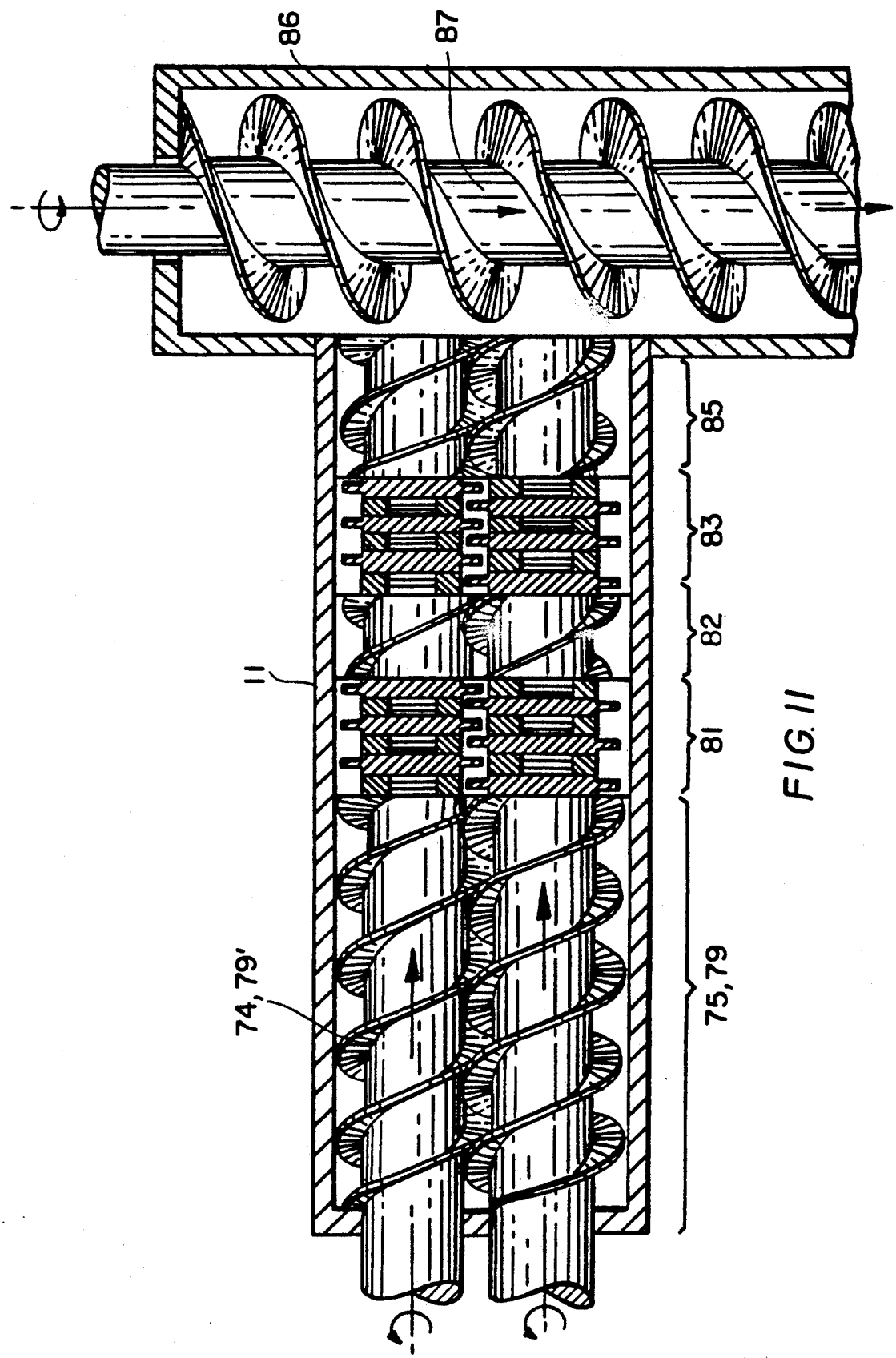
FIG. 11 shows a variant of FIG. 9.

In the embodiment form shown in FIG. 9, as in FIG. 11, a direct transfer of the crumbly dough into the follow screw 86 takes place. The follower screw can already be the actual pressing screw 87, as shown in FIG. 10. However, it is important that the follow screw 86 has a greater conveying capacity than the mixing kneader 11, so that an uncontrolled pressure build-up for the kneader is prevented and so that the risk of an uncontrolled increase in temperature is also prevented. The transfer of the crumbly dough from the mixing kneader 11 to the follow screw 86 is effected in that the conveying screw 87 cuts off the entering extruded dough.

FIG. 10 can also be understood in such a way that the shown individual mixing kneading shaft symbolizes a shaft, or three or more shafts, in a schematic manner.

The invention is explained in more detail in the following four examples.

EXAMPLE 1

Spaghetti, diameter 1.75 mm

| Raw materials: 100% durum middlings | |
|---|---|
| granulation smaller | 0.350 mm |
| protein | 14.1%/TS |
| ash | 0.90%/TS |
| wet crude-gluten | 34% |
| water, temperature | 40° C. |

The raw materials, semolina and water, were fed continuously into the mixing kneader via a metering with an output of 500 kg/h. The screw speed was fixed at 42 rpm, and the cylinder was set at a temperature of 35° C. After a dwelling or mixing and kneading time of 16 seconds, the occurring dough pieces fell into the pressing cylinder in free fall. The pressing parameters were adjusted as follows:

| | |
|---|---|
| screw speed | 20 rpm |
| cylinder temperature | 28° C. |
| head temperature | 35° C. |
| pressure | 110 bar |
| vacuum | 0.85 bar |

The formed spaghetti were hung on rods after pressing and dried in a drying system to a moisture content of 11.5% H₂O.

Quality Results

There is no difference between the spaghetti produced with the new method and the traditional spaghetti in a purely external respect. The transparency for typical water products from durum could be achieved.

No undissolved annoying white spots could be detected. Very good results were achieved with respect to boiling quality. After a boiling time of 12 minutes, the "al dente" quality was achieved. Stickiness and boiling losses were in the range of comparable commercial products.

EXAMPLE 2

Macaroni, diameter 5 mm × 3.2 mm

| Raw materials: | |
|---|---|
| 50% durum middlings | |
| 50% wheat flour | |
| water | |
| Quality of Initial Mixture: | |
| granulation smaller | 0.350 mm |
| protein | 13.0%/TS |
| ash | 0.70%/TS |
| product moisture | 12.5% H$_2$O |

The initial mixture of 50% durum and 50% wheat flour was fed continuously into the mixing kneader by means of a metering with a capacity of 1000 kg/h and kneaded into a homogenous raw dough within 6 seconds. In contrast to Example 1, the raw dough was not fed into the pressing screw in free fall, but rather was transferred directly to the pressing screw according to FIG. 9.

The kneader-pressing screw arrangement can be effected in any desired manner. The transfer of the raw dough into the pressing screw was effected in the low-pressure area without extrusion die pressure, i.e. the pressure never exceeded 50 bar.

The pressing parameters were controlled as follows:

| metering | output | 1000 kg/h dry |
|---|---|---|
| | dough moistness | 31% H$_2$O |
| mixing kneader | screw speed | 60 rpm |
| | cylinder temperature | 30° C. |
| | L/D | 1:7 |
| pressing screw | screw speed | 28 rpm |
| | cylinder temperature | 28° C. |
| | head temperature | 45° C. |
| | pressure | 105 bar |
| | vacuum | 0.9 bar |

The macaroni was dried in a manner similar to Example 1.

Evaluation of Finished Products

Appearance, unboiled: transparent, smooth, without undissolved semolina parts, color typical yellow Boiling behavior: boiling with respect to shape, no crumbling, no surface sliminess, no sticking

EXAMPLE 3

Egg horn-shaped pasta, diameter 5 × 3 mm, length 25 mm

| Raw materials: 100% wheat flour | |
|---|---|
| protein | 12.5%/TS |
| ash | 0.48%/TS |
| product moisture | 13.1% H$_2$O |
| Egg quantity | 3/kg flour |

The raw materials were fed to the mixing kneader by means of metering with a dry capacity of 700 kg/h and processed into a raw dough in the same manner as in Examples 1 and 2.

A granulation device was attached to the outlet of the mixing kneader in order to granulate the occurring dough pieces. The transfer was effected in a free falling manner in vacuum on the pressing screw.

Production Parameters

| metering | output | 700 kg/h |
|---|---|---|
| | dough moistness | 31% H$_2$O |
| mixing kneader | screw speed | 50 rpm |
| | cylinder temperature | 40° C. |
| | L/D | 1:7 |
| | screw profile: | |
| | a) inlet screws | |
| | b) shearing and conveying elements | |
| | c) kneading shears as discharge screw pair | |
| pressing screw | screw speed | 24 rpm |
| | cylinder temperature | 28° C. |
| | head temperature | 40° C. |
| | pressure | 110 bar |
| | vacuum | 0.9 bar |

The egg horn-shaped pasta which were cut at the extrusion die were dried by means of shaking dryer, preliminary dryer and finishing dryer.

Evaluation Results

Raw horn-shaped pasta, unboiled: typically yellow, transparent, without undissolved parts, smooth surface Horn-shaped pasta, boiled: boiling time 10 min; water absorption—210%; boiling losses—less than 5%; not sticky, smooth surface, stable with respect to shape, typical taste, no annoying or negative changes in flavor

EXAMPLE 4

Spirals, two turns

| Starting products: 100% Durum middlings, fine | |
|---|---|
| granulation smaller | 0.250 mm |
| protein | 13.5%/TS |
| ash | 1.00%/TS |
| product moisture | 13.6% H$_2$O |

The raw material was moistened with water to a dough moisture of 32% H$_2$O and processed in the mixing kneader to form a raw dough. Instead of direct feed into the pressing screw, the dough pieces were conveyed to a converted pasta press by means of a conveying transporting means and fed directly into a feed screw and subsequently pressed to form spirals.

Production Parameters

| metering | output, dry | 800 kg/h |
|---|---|---|
| | dough moistness | 32% H$_2$O |
| kneader | analogous to Example 3 | |
| shaper | feed screw | 31 rpm |
| | pressing screw | 24 rpm |
| | cylinder temperature | 25° C. |
| | head temperature | 35° C. |
| | pressure | 110 bar |
| | vacuum | 0.9 bar |

The subsequent drying was effected analogous to Example 3.

Evaluation results

Showed the same evaluation criteria as in Example 3 in comparison to commercial products. It was possible to achieve the quality of commercial products.

While the foregoing description and drawings represent the preferred embodiments of the present invention, it will be obvious to those skilled in the art that various changes and modifications may be made therein without departing from the true spirit and scope of the present invention.

What is claimed is:

1. A mixing kneader device for the production of raw dough, comprising: a closed housing, a product feed inlet, a water feed inlet, a discharge outlet, product flowing in a direction from product feed opening to discharge outlet, and continuously working work elements in the housing, said work elements including two cooperating work shafts, mixing and kneading elements which include kneading screws alternating in said product flow direction on each shaft with shearing elements therebetween, wherein said product feed inlet and water feed inlet are disposed in a first portion of the mixing kneader which is provided with screw elements, said product feed inlet being separated from said water feed inlet, said shafts lying in the same plane and said product feed inlet being arranged perpendicular to the plane of said work shafts so that raw product is grasped by said two work shafts and conveyed by positive conveying action at every work cross section of said housing, said discharge outlet being formed without extrusion die.

2. A mixing kneader device according to claim 1, wherein a first set of kneading screws is constructed as a feed screw pair and the last set of kneading screws is constructed as a discharge screw pair.

3. A mixing kneader device according to claim 1, wherein at least three sets of screw pairs are arranged one after the other with a set of shearing element pairs between them in each instance.

4. A mixing kneader device according to claim 1, wherein the work elements are constructed as two shafts rotating in the same direction, wherein the two shafts comprise a drive for less than 20.0 rpm, preferably for 20 to 100 rpm, and particularly preferably for 40 to 70 rpm.

5. A mixing kneader according to claim 1, wherein the ratio of the active length $L_M$ to the inside diameter $D_i$ of the mixing kneader is in the range of 3 to 7.

6. A mixing kneader device according to claim 1, wherein cooling and heat exchange means are arranged in the stationary housing.

7. A use of the mixing kneader according to claim 1, for a pasta line for the production of long or short pasta.

8. A mixing kneader device for the production of raw dough, comprising:
a closed housing, a product feed inlet, a water feed inlet, a discharge outlet, product flowing in a direction from product feed inlet to discharge outlet, and continuously working work elements in the housing, said work elements including two cooperating work shafts, mixing and kneading elements, which include kneading screws, alternating in said product flow direction on each shaft, with shearing elements therebetween, wherein said product feed inlet and water feed inlet are immediately disposed in a first portion of the mixing kneader which is provided with screw elements, said product feed inlet being separated from said water feed inlet, and wherein the device is constructed as a low-pressure two-shaft mixing kneader and a single-shaft pressing screw, product output of the two shaft mixing kneader being fed to said single shaft pressing screw.

9. A mixing kneader device according to claim 8, wherein the active length of the single-shaft pressing screw is at least twice as long as the active length of the mixing kneader.

10. A mixing kneader device according to claim 8, wherein the single-shaft pressing screw, in its entirety, is at least 2.5 times longer than the mixing kneader.

11. A mixing kneader device according to claim 8, wherein the mixing kneader is arranged immediately above the single-shaft pressing screw with a transfer shaft for the dough parts at said single-shaft pressing screw.

12. A mixing kneader device according to claim 8, wherein an air vacuum connection is provided between the mixing kneader and the single-shaft pressing screw.

13. A mixing kneader device according to claim 8, wherein a pressure pump is coupled to the single-shaft pressing screw in the area of the extrusion die for the production of products such as cannelloni or ravioli.

14. A mixing kneader device for the production of raw dough, comprising:
a closed housing, a product feed inlet, a water feed inlet, a discharge outlet, product flowing in a direction from product feed opening to discharge outlet, and continuously working work elements in the housing, said work elements including two cooperating work shafts, mixing and kneading elements, which include kneading screws, alternating in said product flow direction on each shaft, with shearing elements therebetween, wherein said product feed inlet and water feed inlet are immediately disposed in a first portion of the mixing kneader which is provided with screw elements, said product feed inlet being separated from said water feed inlet, and wherein at least one dough rolls is arranged subsequent to the mixing kneader.

15. A mixing kneader device for the production of raw dough, comprising:
a closed housing, a product feed inlet, a water inlet, a discharge outlet and continuously working work elements in the housing, said work elements including two cooperating work shafts, mixing and kneading elements being arranged at the latter with positive conveying action in the entire work cross section of the housing, said mixing and kneading elements being in the form of opposing overlapping screw positions, said screw portions alternating on each shaft with shearing elements therebetween, said shafts lying in the same plane and said product feed inlet being perpendicular to said plane, said shafts coupled to means for driving said shafts at a speed which prevents adverse heating effects in the dough and wherein said water inlet and feed inlet are separated and disposed in a first portion of said housing containing said work elements.

* * * * *